(12) United States Patent
Hamami

(10) Patent No.: US 6,255,377 B1
(45) Date of Patent: Jul. 3, 2001

(54) STRUCTURAL ELEMENT OF METAL TURNINGS IN A PLASTIC MOLDMENT

(76) Inventor: Demir Hamami, 5601 Huntington Pkwy., Bethesda, MD (US) 20814

( * ) Notice: Subject to any disclaimer, the term of this patent is extended or adjusted under 35 U.S.C. 154(b) by 0 days.

(21) Appl. No.: 09/314,405

(22) Filed: May 19, 1999

(51) Int. Cl.⁷ .................................................. C08K 3/00
(52) U.S. Cl. ............................ 524/439; 524/440; 524/441
(58) Field of Search .................................... 524/439, 440, 524/441

(56) References Cited

U.S. PATENT DOCUMENTS

| | | |
|---|---|---|
| 213,107 | 3/1879 | Hall . |
| D. 397,564 | 9/1998 | Hamami ................. D6/511 |
| 3,010,158 | 11/1961 | Broderson ................. 18/58 |
| 3,670,060 | 6/1972 | Cuffaro et al. ............ 264/77 |
| 3,671,615 | 6/1972 | Price ....................... 264/39 |
| 3,716,609 | 2/1973 | Trocciola et al. ......... 264/111 |
| 3,814,790 | 6/1974 | Kato et al. ............... 264/122 |
| 3,839,080 | 10/1974 | Jarema et al. ............ 117/132 B |
| 3,849,527 | 11/1974 | Drostholm ................ 264/35 |
| 3,864,124 | 2/1975 | Breton et al. ............ 75/212 |
| 3,923,946 | 12/1975 | Meyer ..................... 264/111 |
| 4,003,866 | 1/1977 | Paturle .................... 260/17.4 R |
| 4,018,722 | 4/1977 | Baker ...................... 260/2.3 |
| 4,268,467 | 5/1981 | Wagner .................... 264/111 |
| 4,308,226 | 12/1981 | Wingard ................... 264/45.3 |
| 4,615,853 | 10/1986 | Aoyama et al. ........... 264/122 |
| 4,923,665 | 5/1990 | Andersen et al. ......... 264/259 |
| 5,177,124 | 1/1993 | Questel et al. ........... 523/219 |
| 5,244,941 | 9/1993 | Bruckbauer et al. ....... 523/171 |
| 5,280,052 | 1/1994 | Questel et al. ........... 523/219 |
| 5,534,207 | 7/1996 | Burrus ..................... 264/150 |
| 5,547,726 * | 8/1996 | Dingler ................... 428/57 |

* cited by examiner

Primary Examiner—Edward J. Cain
(74) Attorney, Agent, or Firm—Leonard Bloom

(57) ABSTRACT

A structural element having a plurality of recycled, convoluted scrap metal turnings or shavings disposed randomly within a transparent plastic moldment. The turnings or shavings are interlocked with each other and with the plastic and substantially fill the moldment. A method of forming the structural element is disclosed.

9 Claims, 3 Drawing Sheets

STRUCTURAL ELEMENT OF METAL TURNINGS IN A PLASTIC MOLDMENT

BACKGROUND OF THE INVENTION

1. Field of the Invention

The present invention is directed to a structural element of metal and plastic and more particularly to metal turnings or shavings which are interlocked with each other and with the plastic.

2. Description of Related Art

Decorative items made of objects molded in transparent plastic and the method of making these decorative items has been disclosed in several U.S. patents. Hall in U.S. Pat. No. 213,107 discloses an improvement in the manufacture of artificial stone wherein cement is mixed with iron or steel turnings, borings or filings, either wrought or cast, or with oxide of iron. The iron or steel or oxide of iron is disintegrated into very small particles and thoroughly incorporated into the cement. In U.S. Pat. No. 4,268,467, Wagner discloses a process for making friction products wherein the molding utilizes fiber-reinforced articles and, in particular, those articles which are formed from monofilaments, such as metal fibers and processed mineral fibers of the slag type. In U.S. Pat. No. 4,923,665 Andersen et al disclose a method of improving the characteristics of a molded body wherein the matrix may contain, embedded therein, property-improving bodies which are typically fibers and/or plates selected from a group consisting of metal fibers, including chopped steel fibers, mineral fibers, iron whiskers, etc. Cuffaro et al in U.S. Pat. No. 3,670,060 disclose a method for manufacturing artificial variegated marble including individual batches of color components consisting of the particulate natural stone, powdered thermosetting resin, powdered catalyst for the resin and a pigment, all mixed together. Price in U.S. patent No. 3,671,615 discloses a method of making a composite board from shredded or pulverized fibrous and filler materials from which a selected size particle is selected. The particles are mixed with a resin and formed with a platen press. In U.S. Pat. No. 3,716,609, Trocciola et al disclose a process for preparing a molded structure from polyphenylene sulfide resin powder and a filler powder selected from a group consisting of nickel, graphite carbon, magnesium, aluminum, copper, tantalum, titanium, iron and silver. Kato et al in U.S. Pat. No. 3,814,790 disclose a method of making molded composite articles having a colored surface of a mono or multi-colored pattern which is distinctly colored like pottery or marble. Non-combustible inorganic materials are used selected from oxides, silicates, carbonates and phosphates of iron, aluminum, alkali metal and alkali earth metal. Various types of clays and zeolite are disclosed. In U.S. Pat. No. 3,849,527 Drostholm discloses a method for making fiber reinforced or filled resin products using examples of various monomers and polymers. Breton et al in U.S. Pat. No. 3,864,124 disclose a process for producing sintered articles from flexible preforms containing resin and sinterable particulate material selected from a group consisting of metals, inter-metallic compounds, etc. Meyer in U.S. Pat. No. 3,923,946 discloses rigid composite materials based on metal powders, including aluminum and iron in a resin. In U.S. Pat. No. 4,615,853, Aoyama et al disclose a method for producing thermoplastic resin sheet or filler-containing resin sheet. Various kinds of powdery or granular filler material are disclosed. The sheet is formed by feeding the resin and filler between tensioned endless belts which are heated. Broderson, in U.S. Pat. No. 3,010,158 discloses plastic articles in which light reflecting lamellae are incorporated. In U.S. Pat. No. 5,244,941, Bruckbauer et al disclose an artificial stone composition formed from polyester resin, monomer and filler. The filler is primarily a mixture of minerals and chips of previously cured thermosetting resin. Questel et al in U.S. Pat. Nos. 5,177,124 and 5,280,052 disclose decorative molded pieces and a method of making the pieces. Metal particles are mixed with a monomer in a mold and the mold is centrifuged to concentrate the metal particles on the surface. After setting, the product is polished to provide a polished metal surface to simulate the appearance of a solid metal piece. The ornamental design of a surface top is disclosed in Des. Pat. No. 397,564 issued to Hamami.

Thus, although the formation of polymeric resins having particulates formed therein is known, the use of metal turnings or shavings which are twisted and curled and which interlock with each other and with the plastic has not been disclosed. The structural element of the present invention provides a unique aesthetic appearance for furniture, counter tops and architectural surfaces.

BRIEF SUMMARY OF THE INVENTION

It is an object of the present invention to provide a solid surface which has a unique and pleasing aesthetic appearance and which can be varied with respect to color and overall effect.

It is another object of the invention to utilize scrap metal turnings and shavings to form structural elements.

It is a further object of the invention to provide a method for making the structural element.

In accordance with the teachings of the present invention, there is disclosed a structural element which has a plurality of recycled convoluted scrap metal turnings or shavings embedded within a transparent plastic moldment. The convoluted turnings or shavings are interlocked with each other and with the plastic. The turnings or shavings substantially fill the moldment to improve the strength of the structural element. The turnings or shavings are disposed randomly within the clear plastic such that the structural element has a pleasing appearance.

In further accordance with the teachings of the present invention, there is disclosed a method of forming a structural element. Metal turnings or shavings are provided. A catalyzed polymer resin is provided. Approximately equal parts by volume of the metal turnings or shavings are intimately mixed with the catalyzed polymer resin in a vacuum mixer wherein air is removed from the mix and the turnings or shavings are interlocked with each other and with the catalyzed polymer resin. The deaerated mix is introduced into a mold. The mix is allowed to set and cure. The cured mix is removed from the mold, and the cured mix is finished to a desired thickness and surface finish to form the structural element.

These and other objects of the present invention will become apparent from a reading of the following specification taken in conjunction with the enclosed drawings.

DESCRIPTION OF THE PREFERRED EMBODIMENTS

Industrial metal milling processors such as fabricators of aluminum parts and producers of extruded and molded metal parts all generate turnings and shavings as scrap waste as part of their processes. This waste is usually sent to be melted and recycled with general scrap. However, especially with aluminum waste, the turnings and shavings combust before melting and are salvageable only with difficulty and at costs which may be uneconomical. Thus, this material is often available below the market for other metal waste. The present invention discloses a product in which this waste can be used economically. This product is a structural element such as a solid surface material which is intended to be used for furniture, counter top and architectural surfaces.

Figure 1:
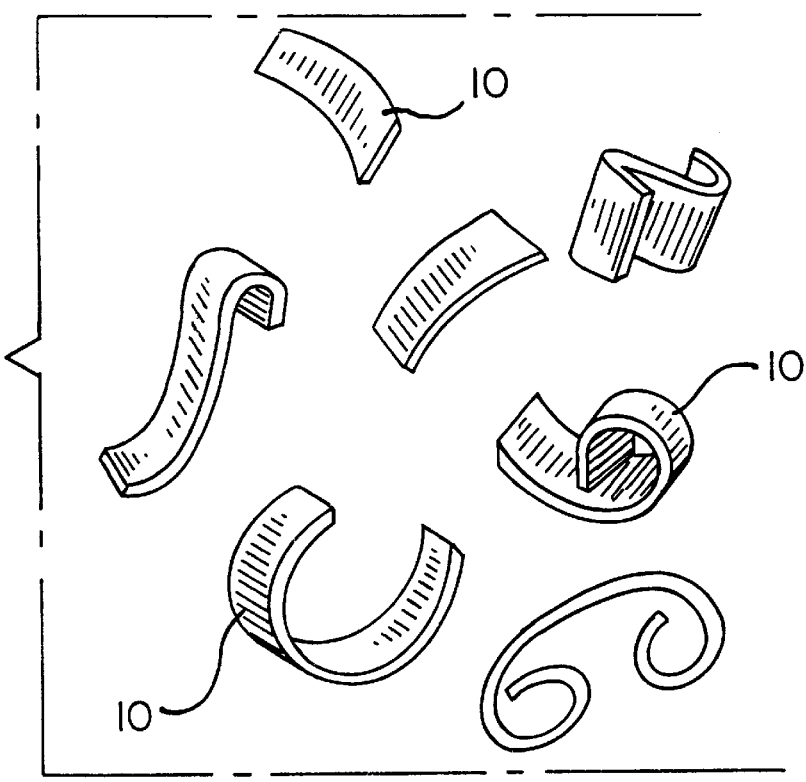
FIG. 1 is a perspective view of the turnings or shavings of scrap metal.

The turnings and/or shavings 10 are convoluted, coiled and twisted pieces of metal which are produced during milling, sawing, routing and other operations conducted on larger pieces of metal. In most instances, these scrap turnings or shavings are at least ¼ inch in length and may be of varying widths and thicknesses depending upon the operation and the type of metal (FIG. 1). It is preferred that the scrap metal turnings or shavings be non-ferrous such as aluminum, copper, brass etc., although ferrous turnings and shavings can be used. Also, the present invention can utilize shavings or turnings of mixed metals or alloys, there is no need to be restricted to only aluminum or only copper (for example).

Preferably, the scrap turnings or shavings 10 are placed on a screen so that filings and flakes less than ¼ inch are separated and not used. The turnings or shavings 10 may then be cleaned but cleaning is not necessary for most scrap.

Aluminum turnings may be colored a wide variety of colors by methods known to persons skilled in the art. The selected single color, or combinations of a plurality of colored turnings, determine the color, decorative or aesthetic effect of the final product.

The scrap metal turnings or shavings 10 may be considered a filler in which one part by volume is intimately mixed with one part by volume of a catalyzed resin 12. The catalyzed resin 12 preferably is a transparent polymer or monomer such as, but not limited to, water resistant polyester, aliphatic acrylics, methyl methacrylate, etc. along with initiators of thermal sensitive, heat activated peroxide to form the plastic matrix. The resin may be colorless or colored. The type of resin selected is dependent on the manner in which the final product will be used. The hardness of the final surface or the exposure to heat are considerations in selecting the type of resin.

One resin which has been used satisfactorily is made by Ashland Chemical Co. and designated as "Ashland LB6029-77" which is a fire retarding solid surface resin. This resin is identified as an example and the invention is not limited to this resin.

Figure 2:
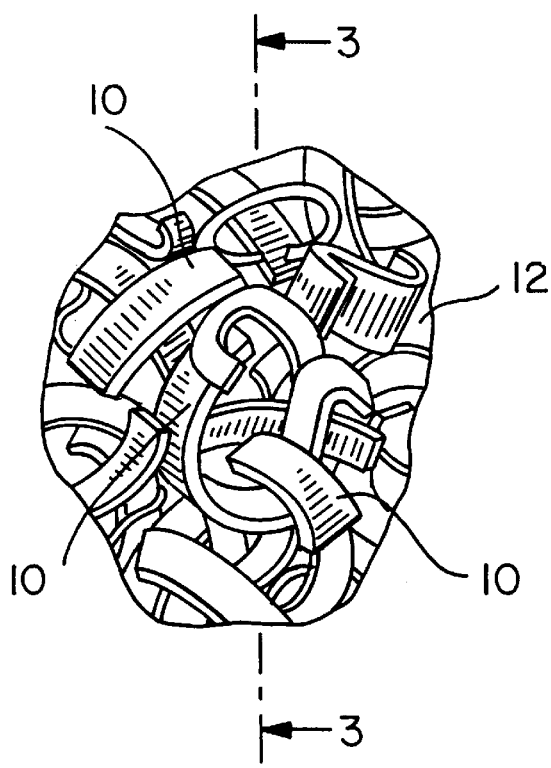
FIG. 2 is an enlarged perspective view showing the interlocking of the turnings and shavings with each other.
Figure 3:
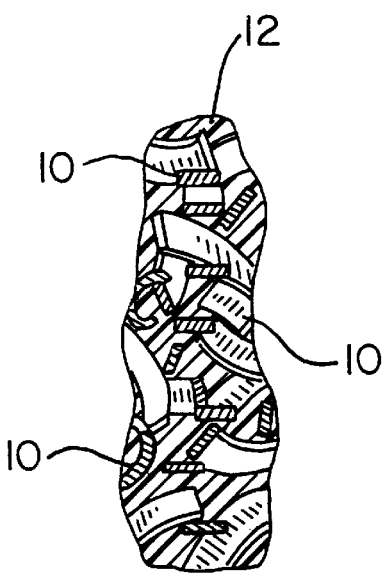
FIG. 3 is a cross-sectional view taken across the lines 3—3 of FIG. 2.

The filler 10 and the resin are intimately mixed in a vacuum mixer such that the convoluted turnings or shavings become interlocked in various planes and the resin then interlocks with the interlocked turnings or shavings 10 (FIGS. 2–3). The turnings or shavings substantially fill the moldment such that the turnings or shavings 10 are randomly distributed throughout. The result is a mechanically strengthened product which has an overlapping of colors. All air is removed under reduced pressure so that no bubbles or voids are formed in the overall matrix of filler and resin when the matrix is introduced into a mold or cast. The mold may assume any desired configuration but in most applications is to form a flat sheet of a desired thickness, width and length. The mix in the mold is allowed to set and cure. Alternately, and to improve structural properties, the structural element 14 may be post cured at approximately 180° for approximately 4 hours. This temperature and time is not critical and depends on the type of resin 12 used.

Figure 4:
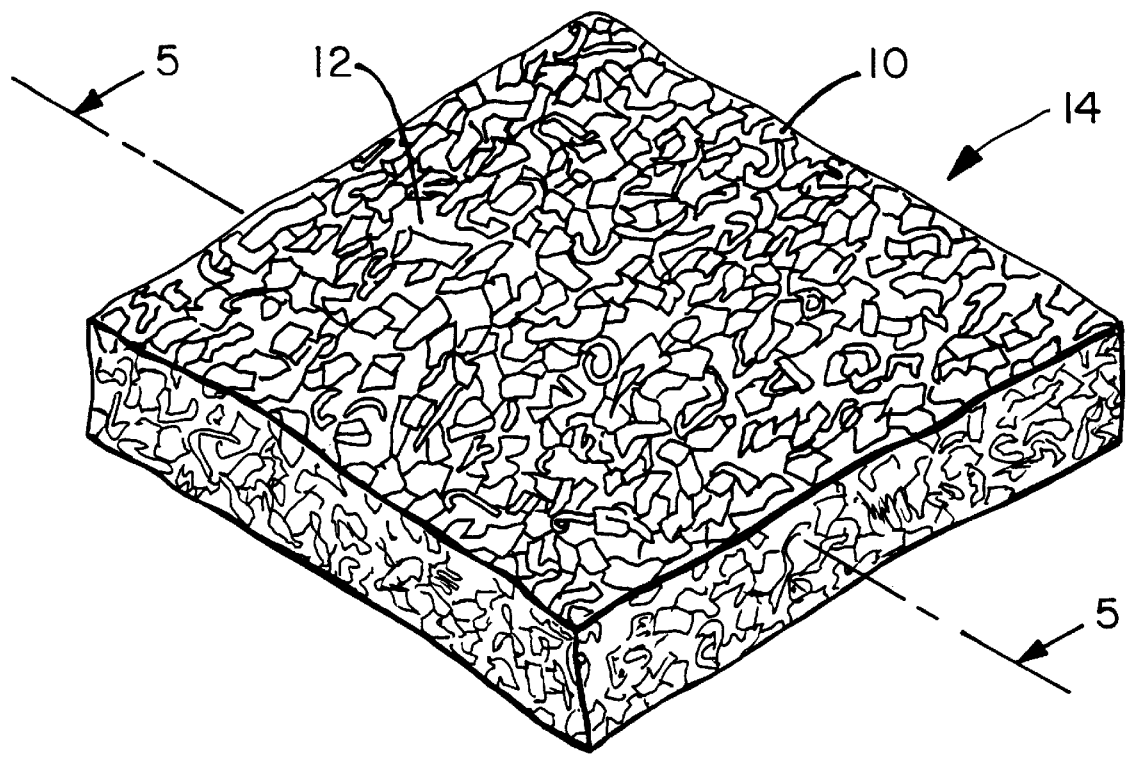
FIG. 4 is a perspective view of a section of the finished structural element.
Figure 5:
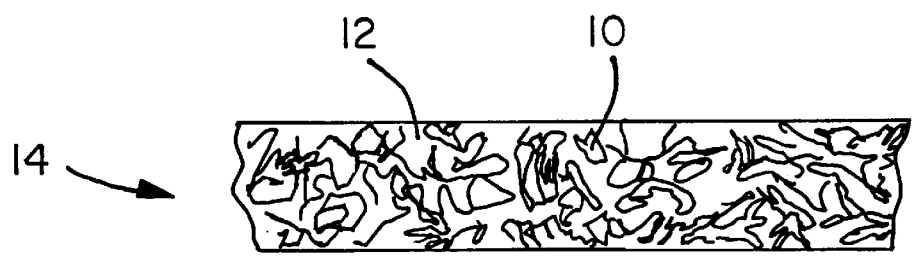
FIG. 5 is a side elevation view of a segment of the finished structural element.

The cured product is removed from the mold and sanded or otherwise finished to a consistent desired thickness and surface finish. The surface finish may be cut with a saw. If the turnings or shavings 10 include ferrous materials, a hacksaw is required but if only non-ferrous turnings or shavings are in the structural element, other types of saws may be used to cut the formed product to a desired size. Industry standards for counter tops are ½ inch to ¾ inch thick. Typical molds produce sheets approximately 36 inches by 120 inches but these dimensions are not limiting (FIGS. 4, 5).

Figure 6:
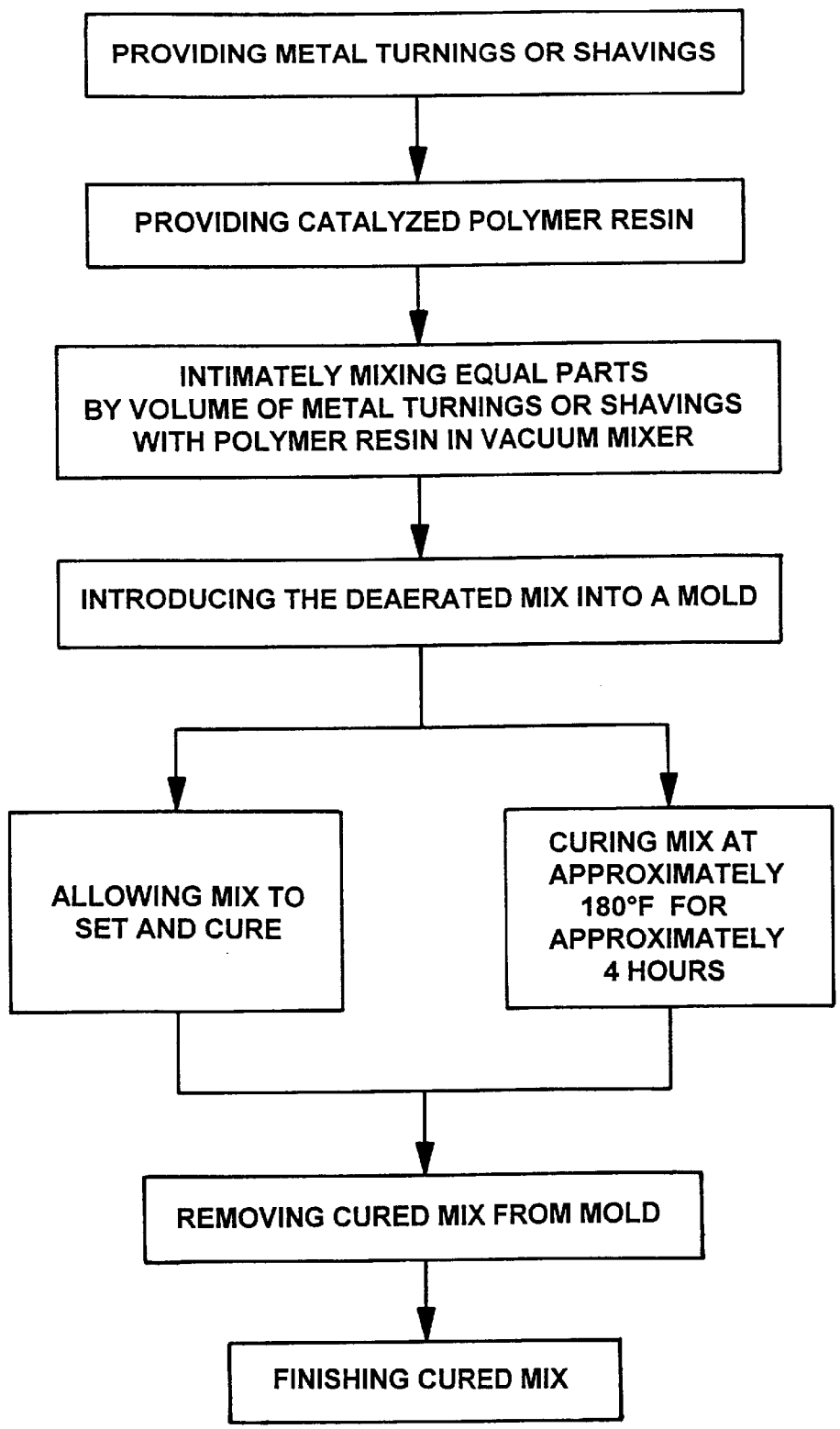
FIG. 6 is a diagram showing the method of forming the structural element.

The present invention discloses a structural element which utilizes scrap metal turnings or shavings 10 which otherwise have little value. The convoluted shavings or turnings 10 are formed in an interlocked matrix with resin 12 and with each other to provide a unique structural element with a pleasing appearance which can be shaped and surface finished as desired. FIG. 6 shows the method of preparing the structural element.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A method of forming a structural element comprising the steps of:

providing metal turnings or shavings, providing catalyzed polymer resin, intimately mixing approximately equal parts by volume of the metal turnings or shavings with the catalyzed polymer resin in a vacuum mixer, wherein air is removed from the mix and the turnings or shavings are interlocked with each other and with the catalyzed polymer resin, introducing the deaerated mix into a mold, allowing the mix to set and cure, removing the cured mix from the mold, and finishing the cured mix to a desired thickness and surface finish to form the structural element.

2. The method of claim 1, further comprising coloring the metal turnings or shavings before mixing with the catalyzed polymer resin.

3. The method of claim 1, wherein the turnings and shavings are salvaged from industrial metal milling processors.

4. The method of claim 1, wherein the turnings and shavings are non-ferrous metals.

5. The method of claim 1, wherein the turnings and shavings are selected to be at least ¼ inch in length.

6. The method of claim 1, further comprising post curing the cured mix at approximately 180° F. for 4 hours.

7. An article of manufacture made in accordance with claim 1.

8. A method of forming a decorative article comprising the steps of:

providing convoluted, coiled and twisted metal pieces,
providing a transparent polymer resin,
mixing the metal pieces and the polymer resin in a vacuum to interlock the metal pieces,
deaerating the mix to remove bubbles and voids,
introducing the deaerated mix into a mold,
allowing the mold to set and cure,
removing the cured mix from the mold, and
finishing the surface of the cured mix.

9. An article of manufacture made in accordance with claim 8.

* * * * *